United States Patent [19]

Lee

[11] Patent Number: 5,130,702
[45] Date of Patent: Jul. 14, 1992

[54] AUTOMATIC COLOR CONVERTER FOR ON-SCREEN SIGNAL

[75] Inventor: Bong-Sun Lee, Suweon, Rep. of Korea

[73] Assignee: SamSung Electronics Co., Ltd., Suweon, Rep. of Korea

[21] Appl. No.: 451,162

[22] Filed: Dec. 15, 1989

[30] Foreign Application Priority Data

Jul. 13, 1989 [KR] Rep. of Korea .................. 89-10138

[51] Int. Cl.$^5$ ............................................. G09G 1/28
[52] U.S. Cl. ................................... 340/703; 340/701;
340/730; 358/23; 358/48
[58] Field of Search ................ 340/701, 703, 730;
358/23, 48, 182, 183

[56] References Cited

U.S. PATENT DOCUMENTS

| | | | |
|---|---|---|---|
| 3,911,418 | 10/1975 | Takeda | 340/703 |
| 4,388,639 | 6/1983 | Cox et al. | 340/701 |
| 4,467,322 | 8/1984 | Bell et al. | 340/703 |
| 4,994,905 | 2/1991 | Lee et al. | 358/183 |

Primary Examiner—Jeffery A. Brier
Assistant Examiner—Regina Liang
Attorney, Agent, or Firm—Robert E. Bushnell

[57] ABSTRACT

This invention provides an automatic color converter for on-screen signals including a color television displaying the color signals of image signals provided from a color demodulation integrated circuit on a cathode-ray tube through a cathode-ray tube driver. The converter uses a level detector for detecting the level of the original color signals R, G and B for image signals provided through a color demodulation IC, a decoder for decoding eight selections according to the detected level state detected through the level detector, a stage for combining the output of the decoder using OR gates, and an on-screen driver for selecting the color signals R, G or B provided from the color demodulation integrated circuit in accordance with the input signal of the combination means and applying the selected signals to the cathode-ray tube. The effect of converting the color of an on-screen signal to be distinguished in accordance with the change of the color of the image signal may be attained according to the present invention.

4 Claims, 1 Drawing Sheet

AUTOMATIC COLOR CONVERTER FOR ON-SCREEN SIGNAL

BACKGROUND OF THE INVENTION

The present invention relates to a color television (TV) with on-screen display faculty, and particularly to an automatic color converter for an on-screen signal of a color TV in which the color of the on-screen signal can be automatically converted according to the color change of the image signal displayed on the cathode-ray tube (CRT).

The on-screen display faculty is to display characters representing channel number, present time, etc., in a constant side (upper side), and current information for weather forecast or stock quotations are also provided. Thus, the color for the character or figure is required to be kept in complementary color relation to the bottom screen in an on-screen mode so as to be displayed clearly for easy recognition.

In the past, however, without an additional circuit for converting the color of an on-screen signal to be displayed on the CRT, the on-screen signal has been displayed either in a constant color or with a selected color among red(R), green(G) and blue(B) signals provided from an on-screen signal by driving a switch for color selecting. In this case, since the color of the image signal on a CRT is shown in the same color as the color of the on-screen signal, the on-screen signal can not be accurately distinguished.

SUMMARY OF THE INVENTION

It is an object of the present invention to provide an automatic color converter for an on-screen signal which can convert automatically the color of an on-screen signal according to that of an image signal for the purpose of displaying distinctly the color of the on-screen signal against the bottom color.

According to the present invention, there is provided an automatic color converter for an on-screen signal including the color television displaying color signal of an image signal provided from a color demodulation integrated circuit on a cathode-ray tube through a cathode-ray tube driver. The converter uses level detector for detecting the level of the original color signals R, G and B of the image signal provided through the color demodulation IC, a decoder for decoding eight cases according to the detected level state detected through the level detector, a stage for combining the signals from the decoder using OR gates, and an on-screen driver for selecting the color signals R, G or B provided from the color demodulation integrated circuit in accordance with the input signal of the combining stage and applying the selected signals to the cathode-ray tube.

DETAILED DESCRIPTION OF THE INVENTION

Figure 1:
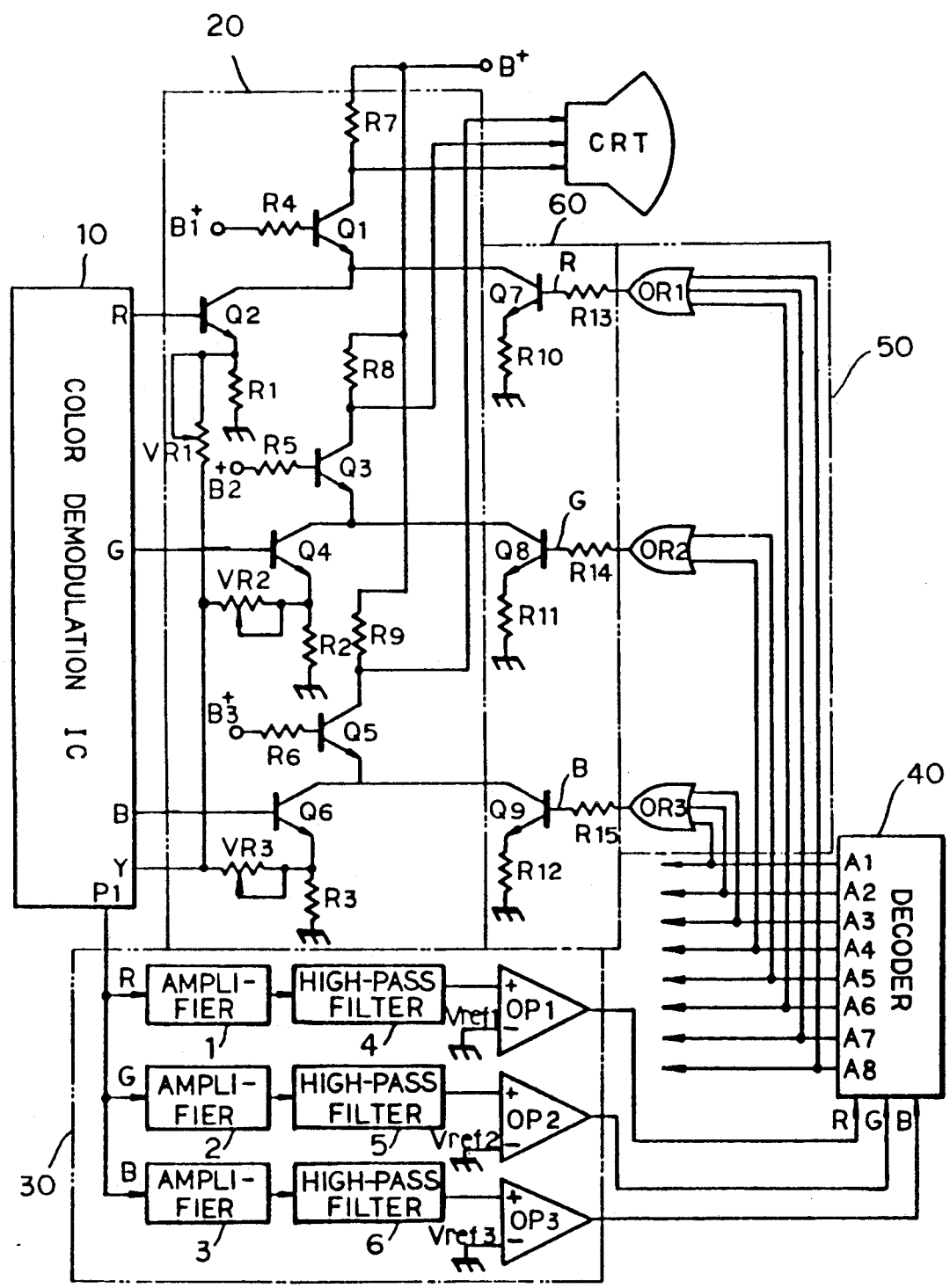
FIG. 1 is a circuit diagram of an automatic color converter for an on-screen signal.

The present invention will be now described in more detail with reference to the accompanying drawing. FIG. 1 is an embodiment of the present invention. A CRT driver 20 for providing the color signals R,G,B of the image signal to the CRT is connected between a color demodulation integrated circuit(IC) 10 and a CRT.

The CRT driver 20 includes switching transistors Q2, Q4 and Q6 which are turned on by color signals R, G and B provided from the color demodulation IC 10.

Switching transistors Q1, Q3 and Q5 with respective base resistors R4, R5 and R6 are connected to respective collectors of switching transistors Q2, Q4 and Q6. Also, driving voltages B1+, B2+ and B3+ are connected to the bases of the transistors Q1, Q3 and Q5 respectively in the CRT driver 20 so that the transistors Q1, Q3 and Q5 are turned on accordingly as the transistors Q2, Q4 and Q6 are turned on.

Variable resistors VR1, VR2 and VR3 connected to the emitters of the switching transistors Q2, Q4 and Q6 of said CRT driver 20 the CRT are connected to the terminal to which luminance signal Y is provided.

Thus, the luminance signal Y provided from the color demodulation IC 10 is applied to the CRT by adjusting the variable resistors VR1, VR2 and VR3 connected to the emitters of the transistors Q2, Q4 and Q6.

A level detector 30 for detecting the level of the provided color signals R, G and B of the image signal from the color demodulation IC 10 is connected to amplifiers 1, 2 and 3 for amplifying the color signals R, G and B respectively. Also, high pass filters 4, 5 and 6 are connected to the output terminal of the amplifiers 1, 2 and 3 respectively.

The output signals of the high pass filter 4, 5 and 6 are connected to the (+) input terminals of comparators OP1, OP2 and OP3 respectively, while reference voltages Vref1, Vref2 and Vref3 are connected to (−) input terminals of the comparators OP1, OP2 and OP3 so as to compare the output signal of each comparator with each reference voltage.

Three output terminals of the high pass filters are connected to the three input terminals of a decoder 40 respectively, so that eight signals A1–A8 according to the level state detected by the level detector 30 are decoded. The decoder 40 includes 3 inputs and 2=8 outputs.

The output terminals of the decoder 40 are connected to a combination part 50 which combines the detected signal in the level detector 30. The combination part 50 includes OR gates OR1, OR2 and OR3 combining the output terminal signals of decoder 40.

An on-screen driver 60 is connected to switching transistors Q7, Q8 and Q9 turned on by output signals of OR gates OR1, OR2 and OR3 of combination part 50, and switching transistors Q7, Q8 and Q9 are connected to the emitters of switching transistors Q1, Q3 and Q5 in the CRT driver 20 respectively. Thus, the color for the on-screen signal is selected from among the color signals R, G and B provided from the color demodulation IC 10 and then is provided to the CRT.

In such compositions, the transistors Q1, Q3 and Q5 are turned on due to the supply voltages B1+, B2+ and B3+ through the resistors R4, R5 and R6. At the same time, the provided original color signals R, G and B of the image signal from the color demodulation IC 10 are applied to the bases of the transistors Q2, Q4 and Q6, thereby turning them on. Thus, the supply voltage B+ is transmitted to the collectors of the transistors Q1, Q3, Q5 through the resistors R7, R8 and R9. At this time, by adjusting the variable resistors VR1, VR2 and VR3 connected to the emitters of Q2, Q4 and Q6, the luminance signal Y provided from the color demodulation IC 10 can be applied to the CRT.

After the output signal P1 of the color demodulation IC 10 is applied to the amplifiers 1, 2 and 3 in the level detector 30, the amplified signals are again applied to the high pass filters 4, 5 and 6. Thus, the high pass filtered output signals are applied to the (+) input terminals of the comparator OP1, OP2 and OP3, so as to be compared with the reference voltages Vref1, Vref2 and Vref3 respectively. The output signals of the comparators OP1, OP2 and OP3 in the level detector 30 are provided as the original color signals with level states different from each other. That is, in accordance with the change of the color of image signals R, G and B provided from the color demodulation IC 10, the provided level of the color signals R, G and B in the level detector is changed. The detected signals in the level detector are provided to the decoder 40, so that the combination of three colors R, G and B according to each level state is decoded.

In observing the decoding operation of the decoder 40 in accordance with the output level state of the comparators OP1, OP2 and OP3 in the level detector 30, when the original color signals R, G and B for the on-screen signal provided from the comparators OP1, OP2 and OP3 are all zero, that is (0, 0, 0), only output terminal A5 of the decoder 40 becomes high-level(H-level), the others A1-A4 and A6-A8 are all low-level(L-level).

When the output signals R and G of the comparator OP1 and OP2 are L-levels, while the output signal B of the comparator OP3 is H-level, that is (0, 0, 1) only output terminal A8 of the decoder becomes H-level, the others becomes L-level. Similarly, when the level of original color signals R, G and B of the comparators OP1, OP2, and OP3 is (0, 1, 0), only output terminal A4 of the decoder 40 becomes H-level, the others A1-A2 and A4-A8 are L-level.

All eight cases of the decoder output according to the level of the R, G and B signals are summarized in Table 1 hereunder.

TABLE 1

| output state of comparator | | | level state supplied to the output terminal of decoder | | | | | | | |
|---|---|---|---|---|---|---|---|---|---|---|
| OP1 | OP2 | OP3 | A1 | A2 | A3 | A4 | A5 | A6 | A7 | A8 |
| 0 | 0 | 0 | L | L | L | L | H | L | L | L |
| 0 | 0 | 1 | L | L | L | L | L | L | L | H |
| 0 | 1 | 0 | L | L | H | L | L | L | L | L |
| 0 | 1 | 1 | L | L | L | L | L | L | H | L |
| 1 | 0 | 0 | L | H | L | L | L | L | L | L |
| 1 | 0 | 1 | L | L | L | H | L | L | L | L |
| 1 | 1 | 0 | H | L | L | L | L | L | L | L |
| 1 | 1 | 1 | L | L | L | L | L | H | L | L |

As shown above in Table 1, according to the level of the original color signals R, G and B, each output level of the decoder 40 is selected.

In the cases of (001), (011), and (111) of the levels of the original color signals R, G and B provided from the comparators OP1, OP2 and OP3, the output of OR gate OR1 in combination part 50 becomes H-level and is provided to the base of the transistor Q7 in the on-screen driver 60. Therefore, the transistor Q7 is turned on and the supply voltage B+ applied through the resistor R7 and transistor Q1 is then grounded through the transistor Q7. At this time, the color of the on-screen signal on the CRT becomes red and the outputs of the OR gates OR2 and OR3 are all L-level and these outputs turn off the transistors Q8 and Q9 in on-screen driver 60, thus, there cannot be caused any effect to the color of the screen signal.

In cases of (000) or (101), the output terminals A5 or A4 the decoder 40 becomes H-level, thereby making the output of the gate OR2 H-level. Thus, the transistor Q8 is turned on, and the supply voltage B+ applied through the resistor R8 and transistor Q4 in the CRT driver is then grounded through the transistor Q8. At this time, the color of the on-screen signal becomes green and the L-level output of the OR gates OR1 and OR2 due to L-level inputs can not exert influence on the color of the on-screen signal since they turn off the transistors Q7 and Q9 in the CRT driver 60. Similarly, in cases of (0, 1, 0), (1, 0, 0), and (1, 1, 0), the output ports A1, A2, and/or A3 become H-level, thereby making the output of the OR gate OR3 H-level.

Transistor Q9 is turned on and the supply voltage applied through the resistor R9 and Q5 is similarly grounded through the transistor Q9. Therefore the color of the on-screen signal becomes blue. Similarly, the OR gates OR1 and OR2 can not exert influence on the color of the on-screen signal.

As described above, the present invention can convert the color of the on-screen signal in accordance with the change of the color of the image signal so as to maintain a distinct color against the color of the image signal by detecting the change of the level of the original color signal due to the change of the image signal on the CRT in the level detector and controlling them though the on-screen driver after making a combination of each state.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. An automatic color converter for an on-screen signal including color television display color signals for an image signal provided from a color demodulator to a cathode-ray tube through a cathode-ray tube driver, comprising:
    means for providing a first plurality of intermediate signals by detecting levels of the original color components of said image signal provided through said color demodulator,
    a decoder for providing a second plurality of intermediate signals by decoding said first plurality of intermediate signals,
    means for combining the second plurality of intermediate signals, and
    an on-screen driver for providing selected signals by selecting said original components provided from the color demodulator in accordance with the input signal of said combining means and for applying the selected signals to the cathode-ray tube.

2. An automatic color converter as claimed in claim 1, wherein said means for providing said first plurality of intermediate signals comprises:
    a plurality of amplifiers for amplifying the image signal provided from the color demodulator,
    high pass filters for filtering each of outputs provided from each of said amplifiers, and
    comparators for comparing the output of each of said high pass filters applied to first input terminals with reference voltages applied to second input terminals.

3. An automatic color converter as claimed in claim 1, wherein:
said decoder comprises decoding means for providing output signals exhibiting a first plurality of logic states varying according to input levels of the color components applied to said means for providing said first plurality of intermediate signals; and
said combining means comprises a plurality of OR gates for combining the signals from said decoder into output signals from said combining means.

4. An automatic color converter as claimed in claim 3, wherein said on-screen driver comprises:
a first plurality of transistors having control electrodes coupled to control the output of the cathode-ray tube,
each base of said transistors being connected to a different output terminal of said OR gates; and
each collector of said first plurality of transistors being connected to a different emitter of a second plurality of transistors in said cathode-ray driver.

* * * * *

UNITED STATES PATENT AND TRADEMARK OFFICE
CERTIFICATE OF CORRECTION

PATENT NO. : 5,130,702
DATED : 14 July 1992
INVENTOR(S) : Bong-Sun LEE

It is certified that error appears in the above-identified patent and that said Letters Patent is hereby corrected as shown below:

IN THE ABSTRACT

Line 4, replace "signals" (first occurrence) with --signal--.

IN THE CLAIMS

Column 4, Line 54, insert --color-- after "original".

Signed and Sealed this

Twenty-seventh Day of September, 1994

Attest:

BRUCE LEHMAN

Attesting Officer

Commissioner of Patents and Trademarks